US008299889B2

(12) United States Patent
Kumar et al.

(10) Patent No.: US 8,299,889 B2
(45) Date of Patent: Oct. 30, 2012

(54) HOME ENTERTAINMENT SYSTEM PROVIDING PRESENCE AND MOBILITY VIA REMOTE CONTROL AUTHENTICATION

(75) Inventors: Sanjeev Kumar, Sunnyvale, CA (US); Labhesh Patel, San Francisco, CA (US); Shmuel Shaffer, Palo Alto, CA (US); Mukul Jain, San Jose, CA (US); Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 827 days.

(21) Appl. No.: 11/999,967

(22) Filed: Dec. 7, 2007

(65) Prior Publication Data
US 2009/0146779 A1 Jun. 11, 2009

(51) Int. Cl.
*G06F 13/00* (2006.01)
(52) U.S. Cl. .......... 340/3.1; 340/13.24; 725/46; 725/78; 725/81; 348/552; 386/234
(58) Field of Classification Search ............ 340/825.72, 340/3.1, 13.24; 725/46, 78, 81; 348/552; 386/234
See application file for complete search history.

(56) References Cited

U.S. PATENT DOCUMENTS

| 6,256,019 | B1* | 7/2001 | Allport ........................ 345/169 |
| 7,194,755 | B1* | 3/2007 | Nakata et al. ................. 725/78 |
| 2002/0166124 | A1* | 11/2002 | Gurantz et al. ................. 725/78 |
| 2003/0028872 | A1* | 2/2003 | Milovanovic et al. .......... 725/12 |
| 2003/0151538 | A1* | 8/2003 | Escobosa et al. ............. 341/176 |
| 2004/0070491 | A1* | 4/2004 | Huang et al. ................. 340/10.5 |
| 2004/0113929 | A1* | 6/2004 | Matsuzaki .................... 345/700 |
| 2005/0065673 | A1* | 3/2005 | Horst et al. ................... 701/19 |
| 2005/0155062 | A1* | 7/2005 | Hiltunen ........................ 725/46 |
| 2005/0166240 | A1* | 7/2005 | Kim ............................ 725/78 |
| 2005/0196131 | A1* | 9/2005 | Narusawa et al. ............. 386/46 |
| 2006/0056458 | A1* | 3/2006 | Evensen et al. .............. 370/493 |
| 2007/0279247 | A1* | 12/2007 | Rye et al. ................. 340/825.72 |
| 2007/0279389 | A1* | 12/2007 | Hoch et al. ................... 345/169 |
| 2008/0040758 | A1* | 2/2008 | Beetcher et al. ............... 725/81 |
| 2008/0055146 | A1* | 3/2008 | Chen et al. ................... 341/176 |

* cited by examiner

*Primary Examiner* — Jennifer Mehmood
*Assistant Examiner* — Andrew Bee
(74) *Attorney, Agent, or Firm* — Merchant & Gould

(57) ABSTRACT

An apparatus in one embodiment is operable to receive, from a remote control device associated with a video display device, biometric input of a user. Responsive to a match of the biometric input with stored biometric data of the user, the user is authenticated. The remote control device and/or the video display device are then configured based on user settings associated with the stored biometric data of the user. It is emphasized that this abstract is provided to comply with the rules requiring an abstract that will allow a searcher or other reader to quickly ascertain the subject matter of the technical disclosure.

23 Claims, 4 Drawing Sheets

HOME ENTERTAINMENT SYSTEM PROVIDING PRESENCE AND MOBILITY VIA REMOTE CONTROL AUTHENTICATION

TECHNICAL FIELD

The present disclosure relates generally to the fields of biometrics and automated home entertainment systems.

BACKGROUND OF THE INVENTION

Televisions and set-top boxes (STBs) for accessing various video services such as standard broadcast video, satellite, and cable television services, are ubiquitous in households across the United States. Automated home entertainment systems that combine media, entertainment, telecommunications and computing functions are becoming increasingly popular. For example, Pluto Home™ is a commercially-available home automation system that allows a user to control their whole house with a mobile phone. The mobile phone acts as a universal remote for things such as lights, television, CD/DVD playback, stereo, security, climate control, etc. A family member, for instance, may press a 'TV' button on their mobile phone to automatically switch the nearest television set to their favorite broadcast program. The system works by detecting the unique ID that is broadcast by each mobile phone. It then uses a mapping of mobile phone IDs to family members to determine who is in the room.

Automated home entertainment systems that rely upon mobile phones and similar types of detection schemes are prone to several problems. First, the mobile phone may be used by one other than the registered owner or primary user of the phone. By way of example, a young child may be able to watch programs having inappropriate content (e.g., excessive violence, adult themes, nudity, etc.) just by pressing a button on an adult's mobile phone that has been inadvertently left in the room. In such situations the entertainment system has no way of knowing who is actually using the phone, and simply assumes that the owner or person assigned to the mobile phone wishes to watch one of his favorite programs. Other drawbacks include that fact that people usually do not carry their mobile phone with them as they move around in the house. Rather, people commonly place their mobile phones on a table, a countertop, or into a charger shortly after they enter their home. Some people use their cell phones only on certain days, such as weekdays, but not on weekends. Others opt to set their cell phones down when they arrive at home in order to limit their exposure to potentially harmful electromagnetic radiation associated with prolonged cell phone usage. These habitual patterns of behavior with respect to mobile phone usage can easily defeat the authentication schemes relied upon by automated systems such as Pluto Home.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

OVERVIEW

Figure 1:
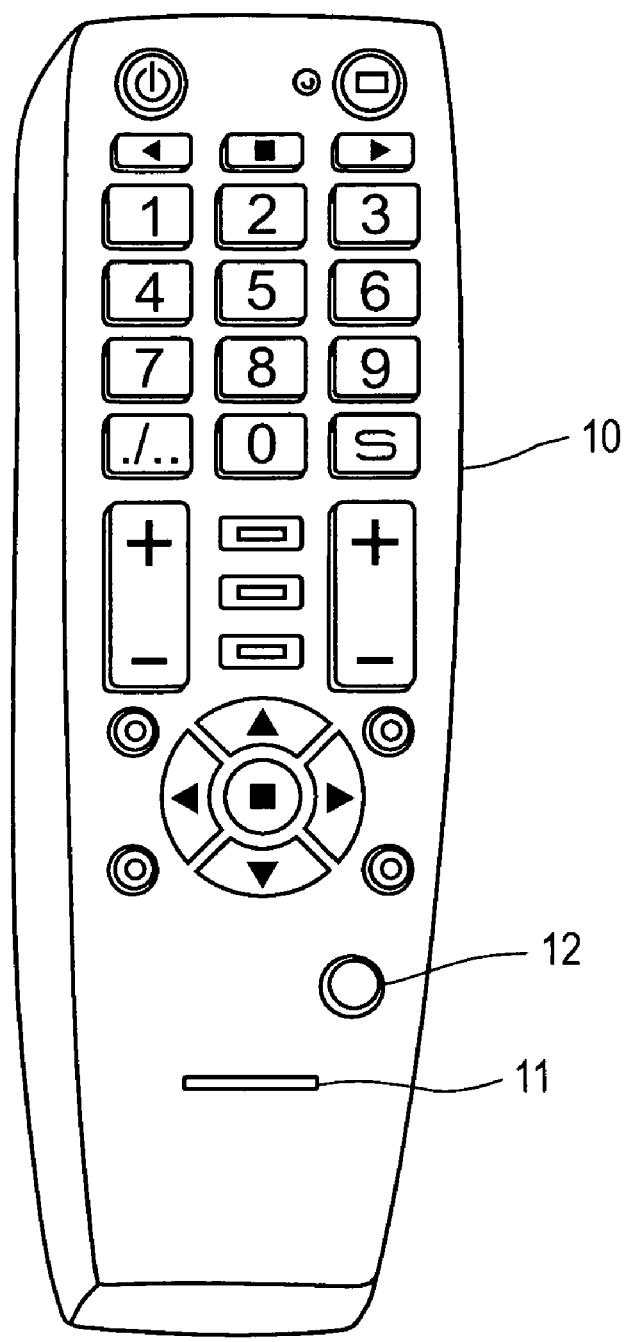
FIG. 1 illustrates an example remote control device with an incorporated fingerprint scanner.

According to one embodiment, a home entertainment system is provided for presence-based streaming of video media to a specific location in a home for a specific person. Authentication and presence of an individual viewer/user is established utilizing biometric input data, such as fingerprint recognition, received through a television or STB remote control device. User authentication allows for a configuration session through the STB to first configure a user's viewing preferences, and to associate and store with the user's authentication profile. Upon authentication of a person who logs into the system through a remote control device, that person's user preference settings are applied. For example, a user's channel preferences and key mappings may be applied to the remote control device, and the system may permit the user access to certain restricted channels.

In addition, when the user moves from one room to another room in the house, the media streaming follows the user from room to room. For example, when the system has identified that a user, who was watching a particular broadcast program in the living room, has moved into the bedroom, it may start playing that same program/channel on the bedroom TV, thereby enabling uninterrupted viewing while facilitating mobility of users and roaming between physical locations. Similarly, the system may set that user's channel preferences on the bedroom TV based on the detected presence of the user in the bedroom. Furthermore, the user's mappings of key shortcuts may be automatically mapped to the television remote control device associated with the bedroom television or STB. These channel preferences and key mappings may be retained on the remote control device until someone else picks up and operates that remote, depending on pre-existing policy/preference settings.

DESCRIPTION OF EXAMPLE EMBODIMENTS

In the following description specific details are set forth, such as device types, system configurations, protocols, methods, etc., in order to provide a thorough understanding of the disclosure herein. However, persons having ordinary skill in the relevant arts will appreciate that these specific details may not be needed to practice the embodiments described.

In the context of the present application, a home entertainment system or home entertainment center (HEC) broadly refers to a system that combines and interconnects multiple media device components in a home, typically controlled by a user through one or more remote control devices. A basic home entertainment system is simply made up of a television connected to a set-top box or program controller (e.g., a server) of some sort. Other, more sophisticated home entertainment systems may include multiple televisions that receive media content from one or more set-top boxes. In certain configurations, a home entertainment system may be implemented as a media theater or home theater system under the control of a server or a personal computer (PC), e.g., the PC connects with a television or a display and functions as a digital video/audio (A/V) player, TV receiver, and digital video recorder (DVR). Such a system is commonly referred to as a home theater PC. Home entertainment systems may also include auxiliary devices such as DVD player(s), VHS player(s), video game boxes, etc. Home theater PCs and home entertainment systems are also sometimes referred to as media centers or media server systems.

A remote control is an electronic device used for the remote operation of one or more media players/machines in a home entertainment system. For example, a remote control is commonly used to issue commands from a distance to a television, set-top box (STB), or other consumer electronics such as a video player (e.g., DVD or DVR). Remote controls for these devices are typically small wireless handheld objects with an array of buttons for adjusting various settings such as television channel, track number, volume, etc. Most often, remote control devices communicate to their respective devices via infrared (IR) signals, although some remote controllers also communicate via radio signals.

A set-top box (STB) or set-top unit (STU) is a device that connects to a television (or other type of display device) and an external signal source, turning the external signal into content which is then displayed on the television screen. For example, many digital set-top boxes receive digital television broadcasts on TV (or HDTV) sets that do not have a built in digital tuner. In the case of direct broadcast satellite (mini-dish) systems, the set-top box operates as an integrated receiver/decoder unit. In the context of the present disclosure, a STB comprises any type of accessory that may connect to a TV, HDTV, PC, etc., for command input, authentication, or presence purposes. Common STBs are satellite receivers, cable TV receivers, Wide Area Network (WAN) OTA receivers, DVD players, VCRs, and so on. A STB may also be configured for delivery of video content to a television from one or more PCs.

In the context of the present disclosure, a biometric authentication system or authentication input system (AIS) is a system that provides secure authentication of a person's identity using biometric input from the person. The authentication information may be utilized for accessing user profile information (including viewing preferences), restricted media content, and/or remote control button configuration settings. Biometric input typically consists of a fingerprint scan, but can also include a facial scan, a palm scan, a voice analysis, or any other input received from a person that can be used by a PC, server, or computer system to uniquely identify that individual.

Referring to FIG. 1, an example television remote control device 10 with an incorporated fingerprint scanner or sensor 11 is shown. Fingerprint sensor 10 is an electronic device that may be used to capture a digital image of a person's fingerprint pattern when a person moves or sweeps their finger over the opening provided by fingerprint sensor 11 in a single scan. Any one of a variety of known or future-developed fingerprint sensor technologies (e.g., optical, ultrasonic, passive capacitance, and active capacitance) may be utilized.

The captured image may be digitally processed and analyzed by remote control device 10. Alternatively, the captured fingerprint image may be communicated (e.g., via infrared, WiFi, Bluetooth, or other wireless communication channel) from remote control device 10 to another system component (e.g., a server, STB, fingerprint recognition unit, etc.) for processing and analysis of the digital image of the captured fingerprint to create a biometric template, i.e., a collection of extracted features, which may be stored and matched against a database of fingerprints of authorized users. It is appreciated that the remote control device and associated STB may communicate their respective identifications to each other in order to establish wireless communication. As such, the STB uniquely identifies the remote control device. The STB may also know the TV set that it is currently controlling, either through similar identification, High-Definition Multimedia Interface (HDMI) discovery capabilities, or through a discovery user interface (UI) session rendered by the STB.

In one embodiment, fingerprints for household members/users may initially be entered through a set-up or training session provided by the STB or the remote control device. Each user may be required to enter a PIN or secret password prior to entering their fingerprint into the remote control device and/or to invoke the setup/training session. Authentication information for each user may comprise information and characteristic features extracted from processing the user's fingerprint image. The end result of the set-up session is that authentication information for one or more users is stored in a system database. Authentication information transmitted via the home network or wireless channel may be stored in one or more remote control devices and/or one or more STBs which comprise the home entertainment network. In one specific embodiment, the remote control device communicates the credentials of the end user to the STB, rather than biometric information.

It is appreciated that user authentication may also allow for a configuration session through the associated STB to configure a user's viewing preferences, which may then be associated or stored with the user's authentication profile information. Upon authentication of a person, various mobility features of the home entertainment system may be activated, depending on a user's particular preference settings. For example, when the system has identified that a user who was watching a particular sports channel in the living room TV has moved to the bedroom, the system may automatically switch the bedroom TV/STB to that particular sports channel in response to the user's presence being established in the bedroom. Similarly, the user's presence in the bedroom may cause the system to automatically set that user's channel preferences on the bedroom TV/STB. Note that the parameters associated with the channel that the user was viewing may also transferred to the new TV/STB. For example, the volume, the language selection of the video, the presentation mode (which may include subtitles), etc., may also be transferred to the new TV/STB responsive to user presence/authentication in the new room. Additionally, the user's mappings of keypad shortcuts may be automatically set on the television remote control device associated with the bedroom TV/STB. These channel preferences and key mappings may be retained on the remote and/or the STB until someone else picks up and operates that remote depending on policy/preferences.

In the embodiment of FIG. 1, remote control 10 is also shown including a presence/authentication switch or button 12. Before a user is logged into the home entertainment system through remote control device 10, the remote control operates as an ordinary or generic device. When a user wants to log into the system and/or establish his presence in the room where the remote is located, he presses button 12, which activates or enables the fingerprint authentication system. Immediately after pressing button 12, the user sweeps his index finger across sensor 11, which then captures an image of the user's fingerprint. Tactile or other sensors (e.g., pressure, proximity, etc.) embedded within remote control 10, may also be utilized to activate inputting the fingerprint image of the person holding the remote. Although the system of FIG. 1 is shown with button 12, it should be understood that this hardware button may be a software-driven menu option, or alternatively comprise a virtual button. For example, in certain embodiments the automatic detection of a known fingerprint may function as an implicit pressing of a virtual presence/authentication button (i.e., a request to establish presence in a room).

In another embodiment, the presence/authentication switch or button is automatically turned off after a predetermined period of time, or once the user sets the remote control device down. In another embodiment, the user has to explicitly turn off the authentication function to disable fingerprint scanning. In yet another implementation, the fingerprint sensor 11 remains active until either the system finds a match with a previously stored fingerprint associated with a user authentication profile, or the system fails to positively identify the user after a given number of scans. Once a positive match is found, fingerprint sensor 11 is deactivated. Note that this enables another user to operate the remote without triggering fingerprint authentication and without preventing a second user's preferences from pre-empting a first user's. This latter embodiment also enables scanning of fingerprint images only when needed so that there is no unnecessary power consumption on the remote due to the authentication system.

In yet another related embodiment, the other buttons of the remote are equipped with fingerprint detection sensors. In accordance with this embodiment, the remote control device compares the partial fingerprint information obtained from the other buttons and uses it to ensure that the commands from the remote control device are issued by the person who is currently authenticated on that device. Note that in this embodiment, a thorough authentication is initially performed via fingerprint sensor 11, while later fingerprint matching is performed via partial fingerprint information obtained from the smaller fingerprint sensors embedded in the other buttons of the remote control device.

As explained above, in one embodiment the captured fingerprint image (e.g., extracted features, characteristics, signatures, etc.) is communicated from remote control device 10 to a central controlling STB or server for processing, analysis, and user authentication. Alternatively, the processing/authentication functions may be performed by the remote control device. If processing is not performed by the remote control device, the fingerprint image is transmitted to the STB for image processing and authentication. Once properly authenticated, the user's preferences are loaded into the system. The user's preferred remote control button settings may also be communicated wirelessly from the associated STB to remote control device 10.

In other embodiments, other types of biometric input devices (e.g., for retinal, palm, face, voice, DNA, etc.) may be incorporated into television remote control device 10 for authenticating a user and/or establishing a user's presence in a particular room. In still other embodiments, authentication and presence of a particular individual may be established through the use of a personal identification number (PIN) entered by the user into the system via the keypad of remote control device 10, or some other input device communicatively coupled to the local television or STB.

Figure 2:
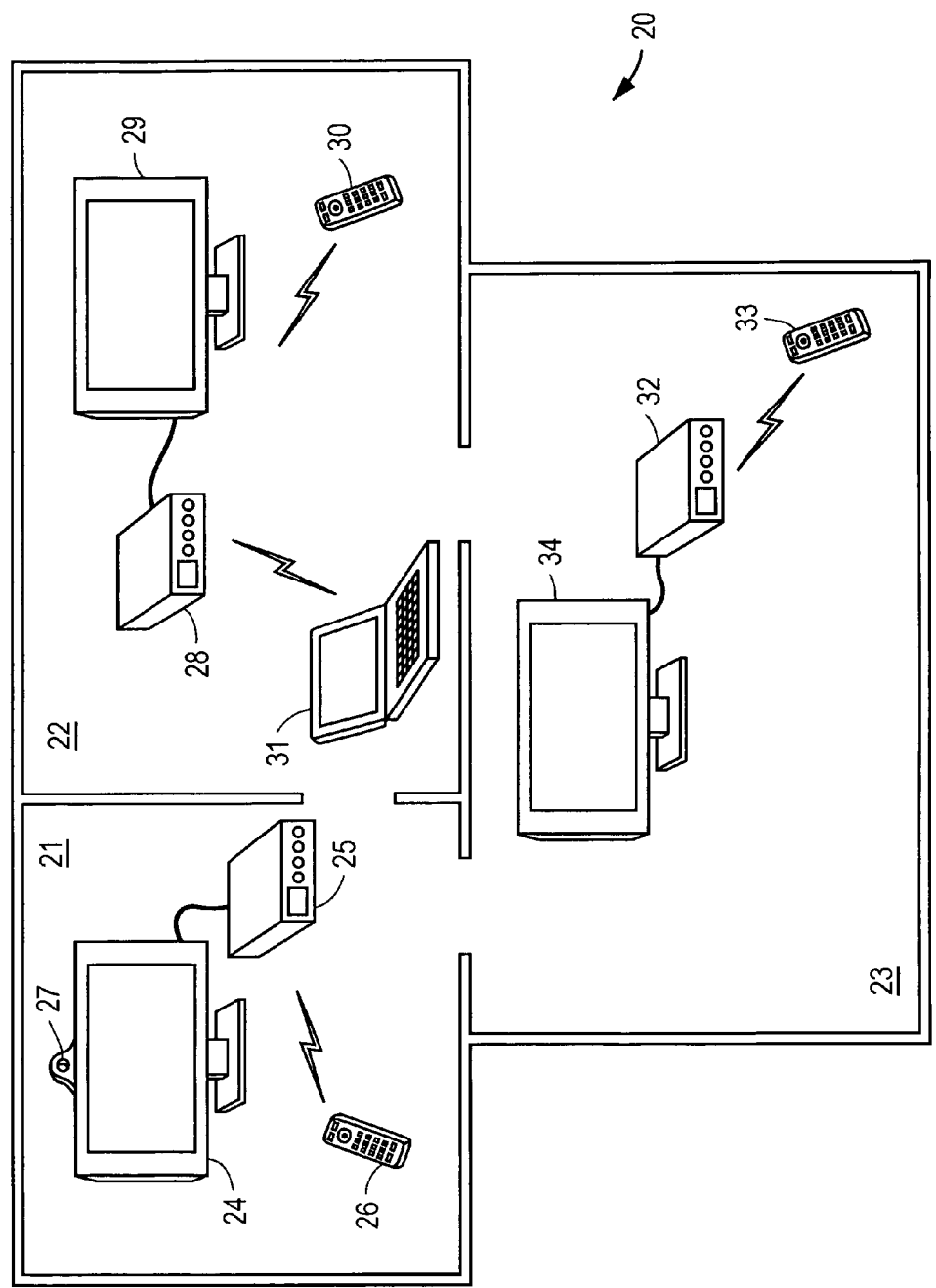
FIG. 2 illustrates an example multi-room home entertainment system.

FIG. 2 illustrates an example multi-room home entertainment system 20 which comprises STBs 25, 28 and 32 respectively coupled to televisions 24, 29, and 34. Each of the STB and television pairs are shown located in separate rooms of the home or dwelling; that is, television 24 and STB 25 are located in room 21, STB 28 and television 29 are located in room 22, and STB 32 and television 34 are located in room 23. Similarly, each STB and television pair is associated with a remote control device that allows a user to input commands and establish user presence in each room (e.g., via fingerprint scanning, other biometric input, or PIN entry). For instance, remote control device 26 is associated with television 24 and STB 25 in room 21; remote control device 30 is associated with television 29 and STB 28 in room 22; and remote control device 33 is associated with television 34 and STB 32 in room 23

Note that television 24 includes a top-mounted camera 27 that may be utilized by the system in conjunction with facial recognition software to identify an individual based on capture of a facial image. Similarly, a PC 31 is shown included in room 21. A PC 31 may be utilized for input of a user PIN or password, for storing fingerprint data, user preferences/settings, policy information, and/or for performing various system administration and/or control functions associated with the home entertainment system. A PC 31 may also be utilized for providing or distributing media content (e.g., DVD movies) to the televisions located throughout the home. PC 31 is shown to interact with the home entertainment system via a wireless network.

Other embodiments may incorporate a server or designate in one of the STBs as a central STB that controls the other STBs in the home. For example, STB 32 may acts as the central control device for the overall home entertainment system, maintaining communication STBs 25 & 28 via wired or wireless transmissions. In such an embodiment, the central STB may control the other STBs and incorporate a database of authentication (e.g., fingerprint) information, as well as storing user preferences/settings, policy information, etc. Alternatively, or in addition, one or more servers in a bidirectional TV network, or accessible through the Internet, may provide database and/or control functionality.

It is appreciated that in other embodiments, fewer or more than three STBs may be distributed throughout a home or other dwelling. Additionally, each STB may control one or more different consumer devices, e.g., TV, DVD player, VHS player, DVR player, etc. It should also be appreciated that the association between the remote control devices and the other equipment in any given room is for illustration and ease of explanation only. In a typical implementation, any remote control may be configured to operate with any other home entertainment system device.

In the embodiment shown in FIG. 2, the fingerprint of a user or the credentials associated with a user is transmitted from a first STB (or TV) to central STB 32 via a home network configured in accordance with a standard such as Universal Serial Bus (USB), IEEE-1294, Ethernet, Home Phoneline Networking Association (HPNA), or multimedia over coax alliance (MoCA). (For clarity reasons, the network connection is not shown in FIG. 2.) Hence, the user does not need to enter his/her fingerprint twice. By way of example, a user may utilize remote control device 33 to establish his presence in room 23 by first pressing a presence/authentication button on remote control device 33, and then swiping of his fingerprint over the fingerprint scanner or sensor located on the remote control device. In response, STB 32 processes and analyzes the user's fingerprint in order to authenticate the user and load his particular preferences/settings on television 34 and remote control device 33. In certain embodiments, pressing the presence/authentication button twice disables fingerprint scanning.

In the embodiment shown, assume that the user leaves room 23 and walks into room 21. When this happens, the user may establish his presence in room 21 in the same manner as before; namely, by pressing the presence/authentication button on remote control device 26, followed by a swipe of his finger over the fingerprint scanner. As previously discussed, in a specific embodiment the remote control device does not have button 12 and as such swiping of the finger over the sensor 11 provides an implicit authentication request. Alternatively, camera 27 mounted on television set 24 may be utilized to capture an image of the user, which can then be analyzed and compared against a database of known users or family members of the household. Regardless how the user's presence is established in room 21, the biometric data (or PIN) is received by STB 25 and transmitted to central STB 32 for processing and analysis. Once the user has been positively identified (i.e., his presence is established in room 21) central STB 32 communicates the user's preferences, channel settings/permissions, button (softkey) settings, etc., to devices 24-26 in room 21. By way of example, if the user was watching ESPN in room 23, after walking into and establishing his presence in room 21, television 24 immediately switches to ESPN, and television 24 and remote control 26 are configured with the user's personal preferences/settings.

In the embodiment shown, it is appreciated that as soon as the user's presence is detected in a room, the STB in that room checks if the local TV set is powered on; if the television is turned off, the system powers the TV on. Note that establishing presence and/or authenticating a user in a particular room does not require that the television set (or even the STB) be fully powered-on before fingerprint scanning or other presence/authentication process occurs. In other words, the home entertainment system shown in FIG. 2 automatically turns on the local TV (or DVD player, etc.) in response of detecting a user's presence to whatever mechanism (facial recognition, PIN/password entry, fingerprint scan, etc.) is employed.

In one embodiment, once the system has determined that a user has moved to a different room, the user's settings and preferences on the television and remote control are automatically reset in the room where the user was previously watching a program. For instance, in the example above, once the user's presence is established in room 21 the preference settings for television 34 and remote control device 33 are transported to the home entertainment system components in room 21 and respectively reset to a generic or default configuration setting (e.g., standard television configuration with limited channel access) on the home entertainment system components in room 23.

In accordance with a specific implementation of the system shown in FIG. 2, when a person watching a program on television 29 in room 22 pauses a program on that TV set, the system immediately starts recording that program on a DVR player or other media storage device. In the event that the person turns on another TV set or establishes their presence in another room (say, room 21) then, depending on that person's settings/preferences the system automatically starts playing the paused program onto television 24 from the point where the first TV (television 29) was paused. Again, depending on the person's preferences, the first TV may still be paused so that the person can go back and watch the same program there from where he left off. Alternatively, the system may be configured to automatically turn-off the first TV (television 29) once the second TV (television 24) resumes playing of the paused program.

It is appreciated that different family members may pause different programs on different televisions at different times throughout the home. In one embodiment, when a person turns on any a television set in the house, his last paused program automatically resumes playing from the previous point (depending on his preferences). In another embodiment, whenever a person turns on a TV, the program that he was watching last time starts to play automatically.

In accordance with the above-described embodiment, a policy mechanism may also be incorporated into the system for handling viewing conflicts. For instance, the system may be configured with a policy mechanism that decides who has viewing priority when a person moves from one television to another television in another room where someone is already watching a different channel. The policy mechanism enables a user to specify whose preferences take priority on which TV in the house during what times. For example, in one embodiment the system may asks for explicit permission from the pre-existing viewer before switching channels when someone walks into the room. Another policy enables users to specify a priority list so that if Joe, a knowledge worker, walks in front of a TV that someone else in the house is watching during office hours, then his preferences take priority. Note that the system may be configured such that the program that was being watched by the viewer being preempted is recorded on a DVR player and/or sent to another TV in another room so that the preempted viewer does not miss the program that he was watching.

In one embodiment, authentication profiles are always created by the central STB or server. That is, the STB generates and saves the authentication profile. Upon generating an authentication profile, the central STB assigns it a unique ID. The central STB then communicates that authentication profile to the other STBs in the household. The authentication profile may be communicated to one or more remote control devices, including the remote control device providing the scanned fingerprint to the STB. Although a remote control device may not generate the authentication profile in this particular embodiment, during normal operation (non-training session), the remote control device includes data processing capabilities (e.g., a DSP) to generate the features and/or signatures of the scanned fingerprint image, and also to perform authentication functions locally. Once the authentication is confirmed, the remote control device issues credentials to be used in communication with the STB. The use of the credentials eliminates the transmission of the user's biometric information and thus helps preserve the user's privacy. Alternatively, the remote control device may send the features and/or signatures to the STB (or central STB or server) for authentication.

In another embodiment, the scanned fingerprint is transmitted to the STB for both processing and authentication. In this embodiment, the STB has the resources and capabilities to receive and store fingerprints and throughput capacity to perform the required processing and analysis.

Figure 3:
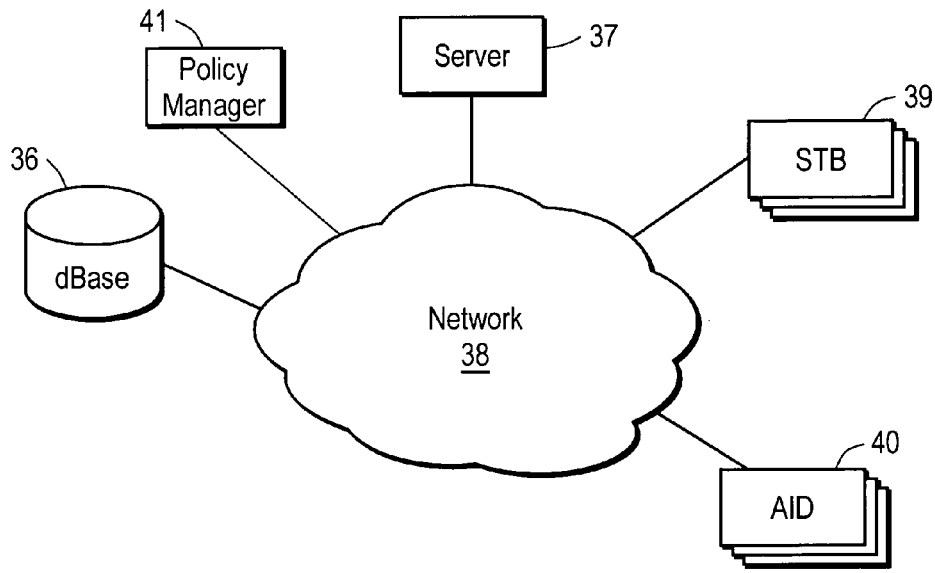
FIG. 3 illustrates an example network configuration for a home entertainment system with presence and mobility features.

FIG. 3 illustrates an example network configuration for a home entertainment system with presence and mobility features. In the high-level diagram of FIG. 3 a plurality of STBs (e.g., associated with one or more homes, offices, etc.) are shown connected via a network 38 with a server 37, database 36, and a corresponding plurality of authentication input devices (AIDs) 40. Network 38 may comprise a local home network as well as external networks outside the home (e.g., a WAN, service provider network, Internet). Similarly, database 36 may comprise a central storage unit containing authentication profiles of numerous different individuals associated groups of which may be associated with different specific households.

In operation, server 37 accesses database 36 to store, retrieve, and match profile data (including biometric data) of persons attempting to login or authenticate their identity on a particular STB 39 via one of the associated AIDs 40. In other words, server 37 and database 36 may be configured either as part of a single home entertainment system, or as part of a regional system that provides registration and authentication services for households and offices located within that region. As previously discussed, in a specific embodiment the database, processor and AID may co-reside in the remote control device and the network may comprise of a local internal network or bus.

Note that the example of FIG. 3 also includes a policy manager 41 connected to network 38. Policy manager 41 may comprise a software or firmware module running on a processor-based device that implements the various policy functions and mechanisms described above. Policy manager 41 may be configured to decide who has channel viewing priority in situations involving multiple persons present in a given room. For instance, if the user in a room is a minor who is watching a children's program and an adult user enters that room, policy manager 41 may be configured such that the system automatically changes the channel to the program the adult was watching so long as it is deemed to be child appropriate. But if the adult was watching a program with extreme violence, nudity, or other adult-oriented themes, policy manager 41 may be configured such that the system does not automatically switch the children's program to the adult's program.

It is appreciated that although policy manager 41 is depicted as a separate device/module in FIG. 3, it may alternatively be incorporated in or associated with any of the other components shown in FIG. 3.

Figure 4:
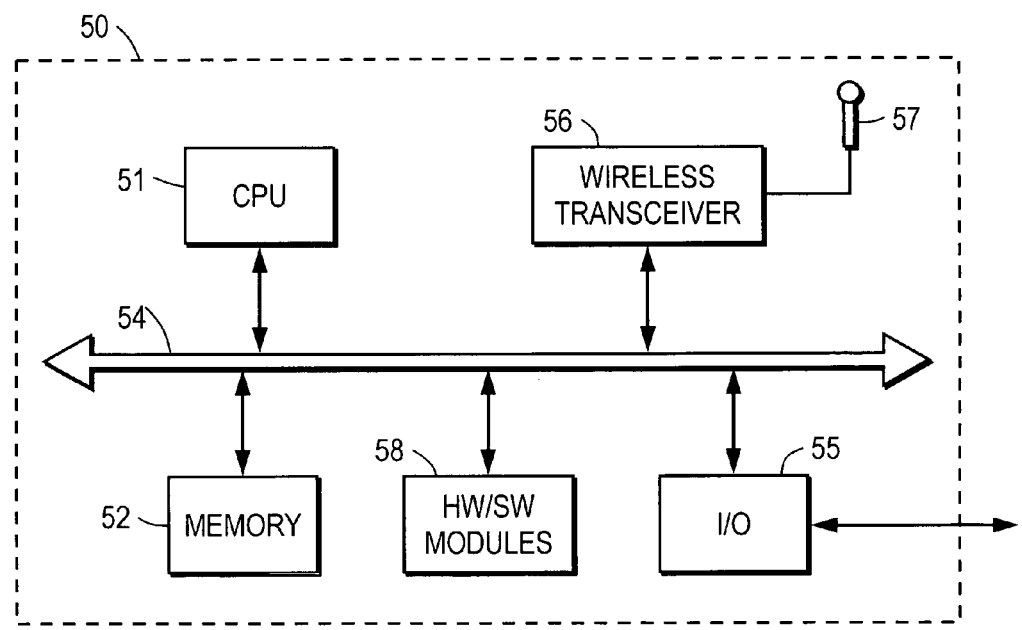
FIG. 4 illustrates an example architecture of a home entertainment system component that incorporates a wireless transceiver.

FIG. 4 illustrates an example architecture of a device 50, such as a remote control device, TV, STB, or any of the devices or network nodes (e.g., a PC or server) shown or described above. Device 50 includes a processor subsystem 51 coupled with a memory 52, one or more hardware/software (or firmware) modules 58, and an input/output (I/O) interface 55 via a system bus 54. I/O interface 55 may include hardware/software components implementing a user interface (UI) for input of commands, data, and selection of various modes of device operation. Modules 50 may include software, firmware, or logic embedded in hardware for implementing any of the functions described herein, e.g., those functions associated with wireless communications, establishing presence, authenticating, transmitting commands and/or data, communicating, etc.

Also coupled to systems bus 54 is a wireless transceiver 56 coupled with an associated antenna 57. In a specific embodiment, communication is via an IR, Bluetooth, or any other similarly suitable communication medium. The specifics of the transceiver 56 and the antenna 57 are changed accordingly to match the media used for external communication. Device 50 may also include biometric or other authentication input components (not shown) coupled to processor 51. Processor 51 is operable to communicate with other components of the home entertainment system via wireless transceiver 56. Hardware, software and/or firmware modules 58 coupled with processor 51 may include software (or firmware) for running a protocol for communicating with other wireless devices. Additionally, modules 58 may include executable code for processing and analyzing biometric input data so that the received input data (e.g., fingerprint characteristics) can be compared and matched with a database of known or registered users. Processor subsystem 51 may run software (or firmware) specifically aimed at registering, training, and/or creating authentication user profiles associated with individual users.

Figure 5:
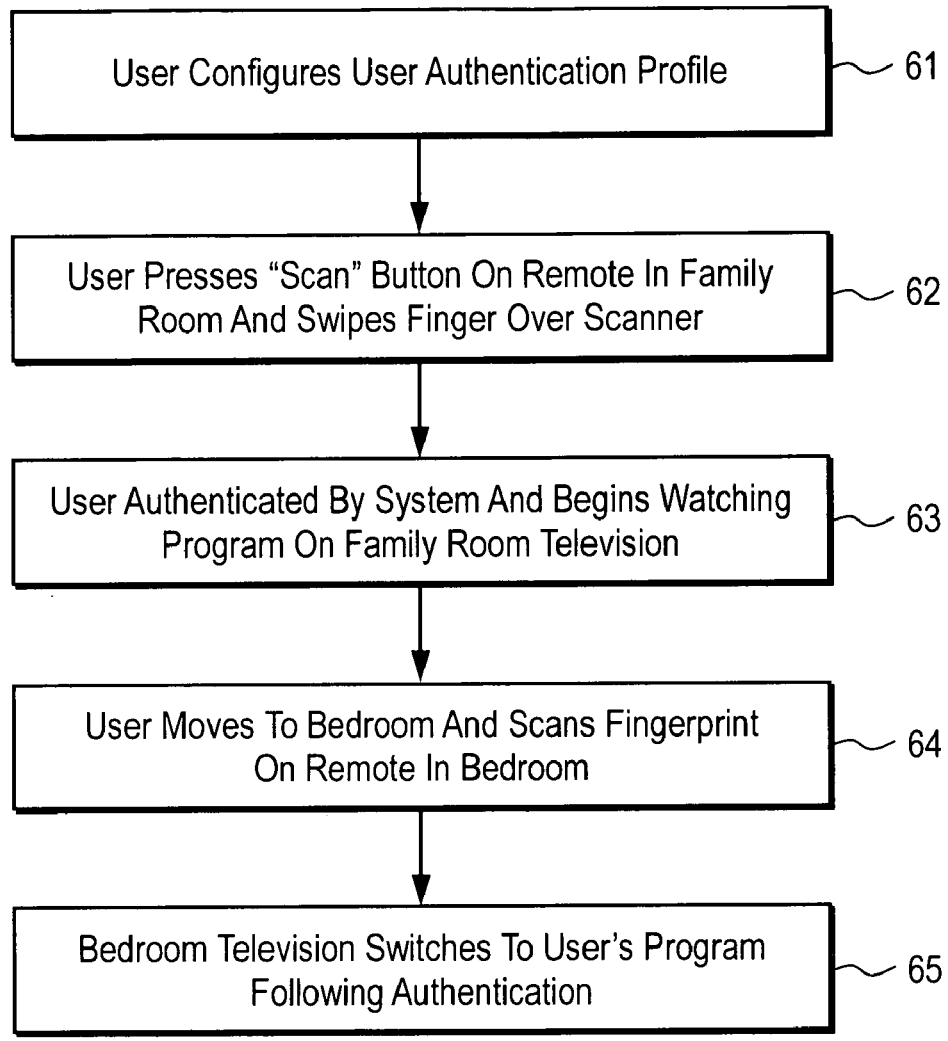
FIG. 5 illustrates an example method of operation for the home entertainment system shown in FIG. 2.

It is appreciated that any wired or wirelessly-enabled device which comprises the elements shown in FIG. 5, and which is utilized in conjunction with a home entertainment system in the various embodiments described above may also comprise separate hardware devices coupled to the system bus 54, or, alternatively, implemented as software programs or modules 58 that run on one or more processors of subsystem 51. In other words, the registration, training, authentication, communication, presence and mobility functions, as well as other associated functions may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

FIG. 5 illustrates an example method of operation for the home entertainment system shown in FIG. 2. The process begins with the user configuring his or her personal user authentication profile as part of an initial set-up or registration process with the home entertainment system (block 61). By way of example, this process may be performed via a graphical user interface that runs on a PC with a network connection to the home entertainment system. Alternatively, creation of a user authentication profile they be performed via a user interface displayed on a television screen, with data input and commands being entered via a remote control device or other keypad/keyboard/tablet input device.

In the example shown in FIG. 5, after a user's authentication profile has been created and stored in the system, the user presses a "presence" or "scan" button on the remote control device associated with a television/STB in a particular room (e.g., family room) and then swipes his finger over the fingerprint scanner (block 62). The user is then authenticated in accordance with any of the example embodiments described previously. Once the user has been authenticated by the system, he may begin watching a program on the family room television (block 63). After some time has passed, the user moves to his bedroom and establishes his presence there by first pressing the scanned button and then scanning his fingerprint on the remote control device associated with the bedroom television. This step is shown occurring in block 64. After the user's presence has been authenticated by the system in the bedroom, the bedroom television automatically turns on and switches to the program that the user was previously watching on the family room TV (block 65).

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For instance, although functions and methods of various embodiments have been described as being embodied on a STB or server, it is appreciated that these same methods and functions may be embodied on other devices, a different type of server (e.g., a conferencing server), or be performed by a third party service application program accessible via a web-based browser. Accordingly, the specification and drawings are to be regarded in an illustrative rather than a restrictive sense.

Additionally, although the present invention has been described in conjunction with TV and STB, it should be understood that it is equally applicable to any media rendering system.

We claim:

1. A method comprising:
receiving first biometric input data from a first user captured by a sensor;
storing a biometric profile of a first user providing the first biometric input data in a database further containing information regarding which of a plurality of users' preference information takes priority on each television in the user's home;
issuing credentials to the first user associated with a unique ID assigned to the biometric profile;
communicating the biometric profile to a plurality of remote control devices associated respectively with a plurality of set-top boxes;
receiving second biometric input data from a second user captured by the sensor;
matching the second biometric input data with the biometric profile data of a particular user;
retrieving information associated with the particular user from the database, the information including user settings; and
configuring a television and a remote control device associated with the sensor based on the user settings based in part on retrieved priority information, wherein configuring the remote control comprises mapping a keypad based on the user settings, and wherein configuring the television comprises powering on the television.

2. The method of claim 1 wherein the receiving of the first biometric input data comprises receiving a wireless transmission that includes fingerprint characteristics of the particular user.

3. The method of claim 2 wherein the wireless transmission comprises an infrared transmission from the remote control device.

4. The method of claim 1 wherein the receiving of the second biometric input data comprises receiving a wireless transmission that includes credentials of the particular user.

5. The method of claim 1 wherein the user settings comprise user preference and television channel access settings.

6. The method of claim 1 wherein the sensor is incorporated in the remote control device.

7. A method comprising:
identifying a person as present in a room based on a comparison of received input uniquely associated with the person comprising at least a unique identifier associated with an authentication profile for the person, wherein the authentication profile contains information regarding which of a plurality of users' preference information takes priority on each television in the user's home;
authenticating the person as a registered user of a home entertainment system;
communicating the authentication profile to a plurality of remote control devices associated respectively with a plurality of set-top boxes; and
configuring a television and remote control device located in the room with profile settings associated with the registered user based in part on priority information contained within the person's authentication profile, wherein configuring the remote control comprises mapping a keypad based on the user settings, and wherein configuring the television comprises powering on the television, wherein the television automatically switches to a predetermined channel responsive to the profile settings, the predetermined channel comprising a channel that the registered user was previously watching in another room along with one or more parameters associated with watching of the channel, the one or more parameters including a volume setting and/or a presentation mode of the channel.

8. The method of claim 7 wherein the identifying of the person comprises receiving a personal identification number (PIN) of the person.

9. The method of claim 7 wherein the identifying of the person comprises receiving biometric input of the person.

10. The method of claim 9 wherein the biometric input comprises fingerprint data.

11. The method of claim 9 wherein the biometric input comprises a facial image of the person.

12. A method comprising:
storing authentication profile data received from a user of a home entertainment system on a remote control device, wherein the authentication profile contains information regarding which of a plurality of users' preference information takes priority on each television in the user's home;
communicating the authentication profile to a plurality of remote control devices associated respectively with a plurality of set-top boxes;
identifying the user as present in a first room directly responsive to first input received from the user, the first input matching identification (ID) data uniquely associated with the user included within the authentication profile data;
enabling viewing of a particular channel on a television located in the first room based in part on priority information contained within the person's authentication profile;
identifying the user as present in a second room responsive to second input received from the user, the second input matching the ID data; and
automatically powering on a television located in the second room and switching the television located in the second room to the particular channel based in part on priority information contained within the person's authentication profile.

13. The method of claim 12 wherein the particular channel comprises a channel that the registered user was previously watching in another room along with one or more parameters associated with watching of the channel, the one or more parameters including a volume setting and/or a presentation mode of the channel.

14. The method of claim 12 wherein the first input comprises either biometric input data or a personal identification number (PIN) of the user.

15. The method of claim 12 wherein the second input comprises either a fingerprint, personal identification number (PIN), or a facial image of the user.

16. The method of claim 12 wherein identifying the user as present in the first room comprises receiving fingerprint data captured by a sensor incorporated in the remote control device associated with the television located in the first room.

17. The method of claim 12 wherein identifying the user as present in the second room comprises receiving fingerprint data captured by a sensor incorporated in the remote control device associated with the television located in the second room.

18. An apparatus comprising:
one or more processors; and
a memory comprising one or more instructions executable at the processors, the one or more processors being operable, when executing the instructions, to:
receive, from a remote control device associated with a video display device, biometric input of a user;
store an authentication profile of the user providing the biometric input data in a database further containing information regarding which of a plurality of users' preference information takes priority on each television in the user's home;
issuing credentials to the user associated with a unique ID assigned to the authentication profile;
authenticate the user responsive to a match of the biometric input with stored biometric data of the user;
communicate the authentication profile associated with the user to a plurality of remote control devices associated respectively with a plurality of set-top boxes, wherein the authentication profile contains information regarding which of a plurality of users' preference information takes priority on each television in the user's home; and
configure the remote control device and the video display device based on user settings associated with the stored biometric data of the user and based in part on priority information contained within the person's authentication profile, wherein configuring the remote control comprises mapping a keypad based on the user settings, and wherein configuring the video display device comprises powering on the video display device.

19. The apparatus of claim 18 wherein the video display device comprises a television.

20. The apparatus of claim 18 wherein the biometric input comprises fingerprint data.

21. The apparatus of claim 18 wherein the biometric input comprises a facial image.

22. The apparatus of claim 18 wherein the user settings comprise user preference and television channel access settings.

23. A remote control apparatus comprising:
means for receiving a first input that uniquely identifies a person as present in a first room;
means for processing the first input to authenticate the person as a registered user of a home entertainment system, and for configuring a television located in the first room with profile settings associated with the registered user, the television automatically powering on and switching to a predetermined channel responsive to the profile settings;
means for communicating an authentication profile associated with the person to a plurality of remote control devices associated respectively with a plurality of set-top boxes, wherein the authentication profile contains information regarding which of a plurality of users' preference information takes priority on each television in the user's home; and
means for identifying the person as present in a second room responsive to second input received from the user, the second input authenticating the person; and
automatically powering on a television located in the second room and switching the television located in the second room to the predetermined channel based in part on priority information contained within the person's authentication profile.

* * * * *